Sheet 1-2 Sheets.

A. Calderhead.
Loom.

No. 202. Reissued May 13, 1851.

N. PETERS, PHOTO-LITHOGRAPHER, WASHINGTON, D. C.

Sheet 2 - 2 Sheets.

A. Calderhead.
Loom.

No. 202. Reissued May 13, 1851.

N. PETERS, PHOTO-LITHOGRAPHER, WASHINGTON, D. C.

UNITED STATES PATENT OFFICE.

ALEXANDER CALDERHEAD, OF PHILADELPHIA, PENNSYLVANIA.

IMPROVEMENT IN JACQUARD MACHINERY FOR WEAVING ALL KINDS OF FIGURED CLOTH.

Specification forming part of Letters Patent No. 1,964, dated February 3, 1841; Reissue No. 202, dated May 13, 1851.

*To all whom it may concern:*

Be it known that I, ALEXANDER CALDERHEAD, of the city and county of Philadelphia, and State of Pennsylvania, have invented certain new and useful Improvements in Looms for Weaving Figured Fabrics, of which the following is a full, clear, and exact description, reference being had to the accompanying drawings, which form part of this specification, and in which—

Figure 1:
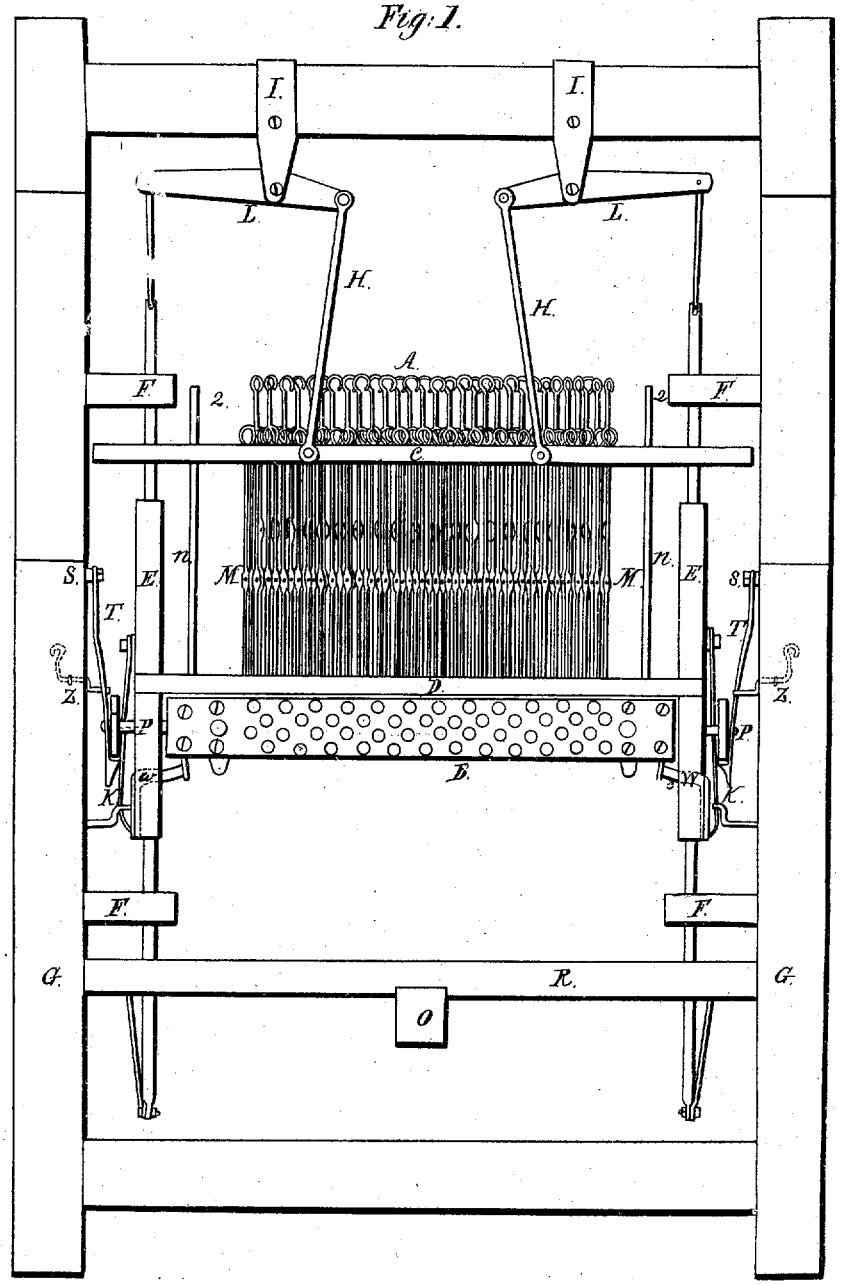
Figure 2:
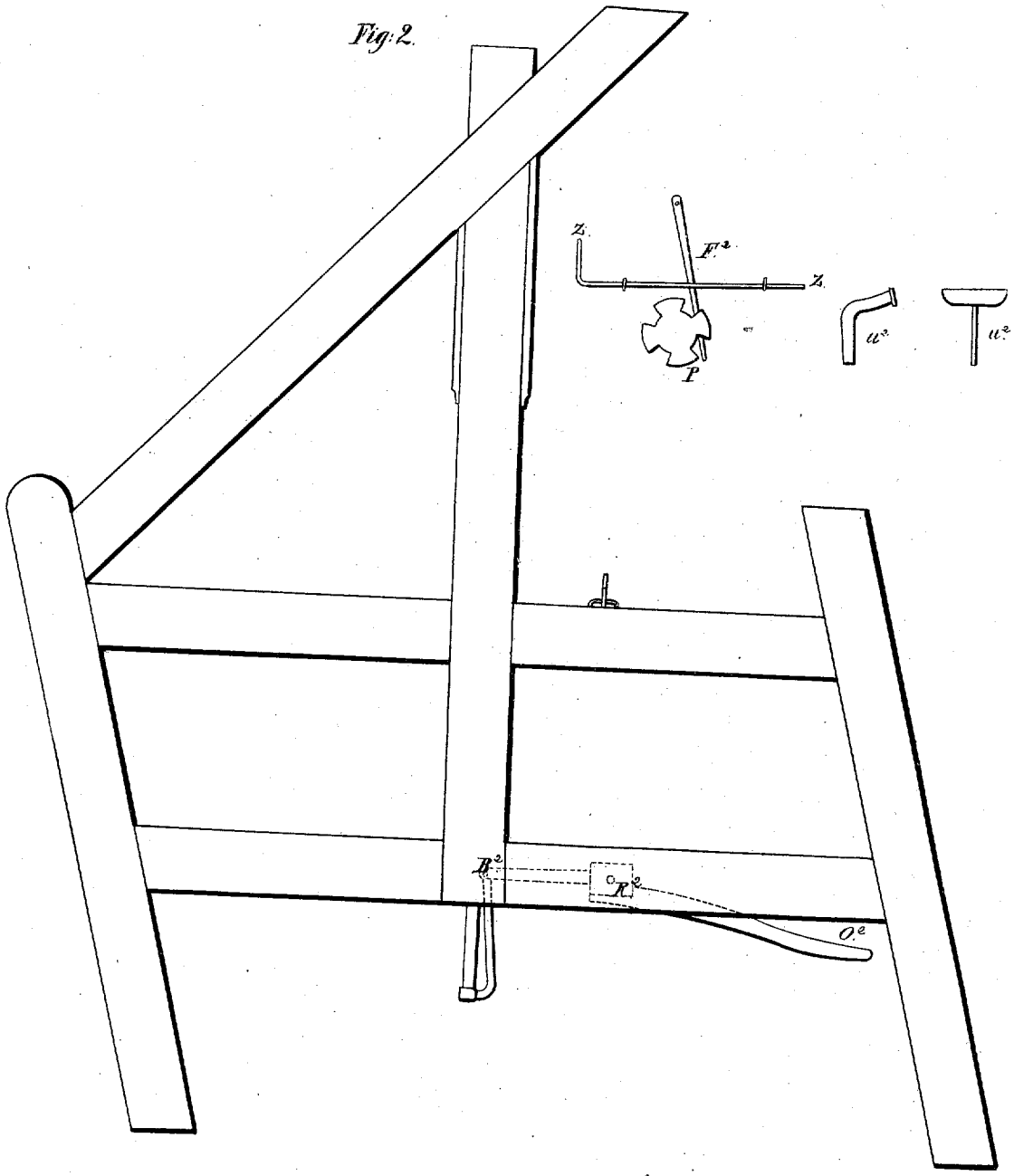

Figure 1 represents a front elevation of portions of a loom with my improvements applied thereto. Fig. 2 is a side view of the same, and Figs. 3 and 4 are views of certain detached portions of the same.

My improvements have reference to those portions of a loom which effect the opening and closing of the shed for the passage of the shuttle, and which dispose the warp-threads so as to form the pattern or figure.

The first part of my invention relates to the operation of the jacquard by its connection with looms of all descriptions for weaving figured fabrics; and it consists in depressing the suspension-board or other equivalent device for effecting the depression of one portion of the warp-threads, while the corresponding pattern-card, acting as a trap-board, is elevated to raise the remaining portion of the warps, the elevation of the former being also simultaneous with the depression of the latter, whereby the power required at each operation for elevating that portion of the harness and its appendages which lifts the warp-threads is balanced in whole or in part by the remaining and descending portion, thus equalizing the power required to give the motions, and therefore admitting of a more rapid working of the mechanism than when the two sets of warps-threads are moved independently, whereby also a great saving of time is effected, for the time expended in moving one set of warp-threads after the movement of the other set has been effected is saved, as the movements of the two in opposite directions are by my improvements effected simultaneously.

The second part of my invention, which relates to the working of the cards to change the figure, consists in working the card-prism by mechanism connected with the loom, while the boards or other devices for working the harness rest from opening and closing the shed.

In order to enable persons skilled in the art of constructing looms to make use of my improvements, I will proceed to describe them in their most simple form, premising, however, that they may be applied to looms of all descriptions for weaving figured fabrics, and particularly to those employed in weaving two and three ply carpets.

The loom represented in the accompanying drawings is constructed with metallic harness, which is formed of ordinary wire, the size of which may be varied according to the kind of goods which the loom is constructed to weave. For three-ply carpet the size should be No. 13 of the wire-gage. This wire is straightened and cut into pieces of equal length, each of which forms a single distinct heddle. These pieces for three-ply carpet should be twenty-four inches in length. One of the extremities of each piece is bent into the form of an eye, as at A, and at a distance of about fourteen inches from the eye or head thus formed the wire is flattened and punched to form mails M M, through which the warp-threads are passed. The metallic heddles thus formed take place and perform the duty of the ordinary harness of looms for weaving figured fabrics. By their use the leads usually employed are dispensed with, as the weight of these metallic heddles is sufficient to depress the warp-threads. The harness thus formed is supported in the loom-frame in an upright position, and is directed, when moving, by a suspension and a hole-board, C and D. These boards are arranged the one directly above the other. The upper one, or suspension-board, C, is suspended by two pairs of links, H H, from the inner extremities of two balance-levers, L L, which are pivoted to hangers I I, which depend from the cross-rail of the loom, and whose outer extremities are connected by links with the upper extremities of two upright bars, E E. The latter are constructed to slide vertically in guides F F, affixed to the standards of the loom-frame, and their lower extremities are connected by links with the outer ends of two equal arms, which project from a rock-shaft, R. The journals of the latter are supported in boxes secured to the loom-frame, and the shaft is caused to rock, and thus alternately raise and depress the sliding bars E E, by means of a treadle, O, which may be operated in any suitable manner. When the sliding bars are raised, the balance-levers L L are moved through the intervention of the links to lower the suspension-board C, and when the slide-bars are depressed this board is correspondingly raised.

In order to guide the suspension-board C in its movement, its extremities are perforated and passed over the sliding bars E E, which thus act as guides. The hole-board D is slotted at its extremities, and is fitted to move freely upon the slide-bars E E. It is suspended from the suspension-board by rods *n n*, which are passed through holes in the suspension-board. These suspension-rods are furnished with heads, which prevent them from passing through the holes in the suspension-board, and their length is the same as that of the heddles. The suspension-board and hole-board are each perforated with a sufficient number of holes to admit the whole series of wire harness or heddles, which are passed through the two boards, and whose heads, when the loom is not in motion, all rest upon the suspension-board C, which thus keeps them all in their proper positions and prevents the entangling of the warp-threads. In order to give room for such an extensive series of metallic heddles, the holes are arranged in several rows. The Jacquard prism B is situated beneath the hole-board D, its journals being supported in suitable boxes secured to the sliding bars E E, so that it is raised and depressed simultaneously therewith. This prism is formed in the present instance of four side plates, which are secured to two square heads. Each side plate is perforated in the usual manner with a series of holes corresponding in number, position, and size with the holes in the hole-board, so that the lower extremities of the metallic heddles, which descend with the suspension-board and are guided by the hole-board, can pass through the perforated sides of the prism. The extremities of the prism-journals extend beyond the sides of the sliding bars, and are each fitted with a notched disk, P P. Spring-hooks T T are also secured to the adjacent faces of the loom-frame in such positions with respect to the notched disks that when the prism has been lowered sufficiently to be free of the lower extremities of the heddles the notches of the wheels will catch upon the hooks, and as the prism continues to descend will be turned one-quarter round, thus turning the prism to present a new face beneath the hole-board. The hooks T T are placed on opposite sides of the center line of the prism, so that they tend to turn the prism in opposite directions. They are also fitted with catches *z z*, by means of which they may be moved and secured out of the range of the notched disks when they are not required to act. When, therefore, one hook is in the range of its appropriate notched disk, the prism at each depression of the sliding bars will be turned in one direction, and when the other hook is acting the movement of the prism will be reversed. Spring-levers are also secured to the sliding bars E E, and press against the under side of the card-prism, thus insuring the stoppage of the motion of the latter when its upper face is parallel with the hole-board D.

The pattern-cards are constructed, connected together, and applied to the prism as in the ordinary Jacquard machine, and are moved by the prism as in that machine to be successively brought into action. When the loom is at work, the suspension-board C and the card-prism are simultaneously moved toward and from each other by the movement of the rock-shaft R. As the suspension-board, with the heddles resting thereon, is depressed, the extremities of those heddles which correspond with the holes of the pattern-card lying upon the rising prism beneath pass through these holes and continue descending into the hollow prism, while the extremities of those heddles which correspond with the blanks of the pattern-card will rest upon the latter, and will be raised by it. The two sets will thus occupy the positions in which they are represented in Fig. 1. By this depression of the one set of heddles and the corresponding simultaneous elevation of the other set the warp-threads passing through their mails are divided into two portions, which are deflected in opposite directions, thus forming the shed for the passage of the shuttle. When the movement of the suspension-board is reversed, by reversing the movement of the rock-shaft R the prism, descending, allows those heddles resting upon the pattern-card to descend until their heads meet and are stopped by the ascending suspension-board, which in its ascent carries up those remaining heddles which had been lowered with it to form the lower portion of the shed. As the diverging movement of the suspension-board and prism is continued, the former carries upward the whole set of heddles to the position whence they first started, while the prism, in descending, is turned one-quarter round by the action of one of the hooks T upon the teeth of the corresponding notched disk P, to present a new card to the extremities of the heddles. It is thus evident that the jacquard in a loom arranged as above described is not only made to perform its customary office in selecting those warp-threads which form the one portion of the shed, but also moves these warp-threads to open and close the shed. The card, therefore, in my loom performs the same office as the trap-board and its equivalents, the comb, griff, frame, and other similar devices employed in various looms to move those warp-threads which have been selected by the jacquard. It is also evident that this equivalent of the trap-board and other analogous devices in ascending with a portion of the harness is counterbalanced in whole or in part by the remaining and descending harness and the suspension-board from which it hangs acting through the intervention of the balance-levers L L, by which arrangement the power required to work the loom is equalized and that freedom from jar and undue strain is attained which always results in machinery from counterpoising any of the moving parts by other parts moving simultaneously in opposite directions. As the warp-threads when the shed is closed all lie in the same plane, which extends unbroken from the whip-roll to the cloth-making point, it is evident that when the lay beats up the strain will be equally divided among the whole set of threads, each of which will bear its proportionate amount. It will also be perceived that the suspension-board C performs the same duty as the knot-board or suspension-board generally employed in looms for figured weaving to bear the weight of the untrapped harness. In addition to this duty, this suspension-board also performs the office of journal in lowering and raising the harness and warp-threads to form the lower part of the shed. It is also evident that the lowering and raising of the suspension-board and harness to lower and raise the warp threads that form the lower portion of the shed, simultaneously with the elevation and depression of the jacquard, and selected or trapped harness to raise and lower the warp-threads that form the upper portion of the shed, not only admits of the one being counterbalanced by the other, as above described, but also saves about half the time that would be required if these operations were performed consecutively.

Another advantage which results from my improvements, and which is of considerable importance in the operation of the loom, is the working of the card-prism to change the figuring-card when the harness is at rest from opening and closing the shed, this working of the card-prism being effected after the harness has closed the shed and before it begins to open it, by which means the positive and regular selection or trapping of the harness is rendered more certain than it would be if the card-prism were working to change the card while the harness was working to open or to close the shed.

The wire harness I have described may be connected with the warp threads in the usual manner, or may act directly upon the warp-threads, as above set forth. In the latter case it possesses an advantage over the harness usually employed in looms for figured weaving, as by its employment the loom may be made of about half the height of a loom with twine harness. This reduction in the height of looms admits of their operation in rooms of the usual height of those in ordinary cotton and woolen factories, and therefore dispenses with the construction of a room of extra height, especially adapted for them to work in, as is necessary with looms in which twine harness is employed. This wire harness also takes the place of the ordinary Jacquard needles in selecting the warp-threads, and, in fact, the wire harness is neither more nor less than a system of Jacquard needles arranged and constructed in such manner that they not only perform their ordinary duty of selecting the warp-threads, but also perform the duty of harness in opening and closing the shed, so that, while the pattern-cards perform the duty of trap-boards, the needles perform that of harness, by which means the mechanism of looms is greatly simplified.

In the foregoing description and in the drawings therein particularly referred to one mode of arranging the Jacquard machine and of mounting the loom to adapt it to the use of the wire harness is described and represented. There are various other modes of arranging the Jacquard machine and its known equivalents for selecting warp-threads, and various ways of mounting the loom, which are well understood by weavers, and which may be varied according to the kind or style of goods to be produced. These various modes of arranging the Jacquard machine and of mounting the loom may be used in connection with any part or the whole of my said improvements, as may be found expedient.

It is obvious that the principles herein specified as constituting my invention are susceptible of great modification, and under such modifications can be applied with great advantage to looms generally for weaving figured fabrics.

Having thus described my improvements in looms and pointed out their application to looms for weaving carpets and other figured fabrics, what I claim therein as new, and desire to secure by Letters Patent, is—

1. In connection with looms for weaving figured fabrics, depressing the suspension-board or its equivalent, while the corresponding pattern-card, acting as a trap-board, or its equivalent, is elevated, substantially as described.

2. Working the card-prism by mechanism connected with the loom, and while the boards or their equivalents for working the harness are not opening and closing the shed, substantially as described.

In testimony whereof I have hereunto subscribed my name this 21st day of February, A. D. 1851.

ALEXANDER CALDERHEAD.

Witnesses:

P. H. WATSON,

CLEM. S. STULL.